United States Patent [19]

Zondler

[11] Patent Number: 4,822,143
[45] Date of Patent: Apr. 18, 1989

[54] PICTURE-REPRODUCING ARRANGEMENT USING A PICTURE TUBE, AND METHOD OF MANUFACTURING SAME

[75] Inventor: Rolf Zondler, Stuttgart, Fed. Rep. of Germany

[73] Assignee: Nokia Graetz GmbH, Pforzheim, Fed. Rep. of Germany

[21] Appl. No.: 111,693

[22] Filed: Oct. 21, 1987

[30] Foreign Application Priority Data

Oct. 23, 1986 [DE] Fed. Rep. of Germany ....... 3636059

[51] Int. Cl.$^4$ ................................................ G02F 1/13
[52] U.S. Cl. ................................. 350/337; 350/350 S; 350/350 R; 350/339 R
[58] Field of Search ................. 350/330, 350 R, 350 S, 350/334, 339 R, 337, 331 R; 252/299.01

[56] References Cited

U.S. PATENT DOCUMENTS

| | | | |
|---|---|---|---|
| 3,736,047 | 5/1973 | Gelber | 350/339 R |
| 3,869,196 | 3/1975 | Kubota | 350/337 |
| 4,367,924 | 1/1983 | Clark et al. | 350/350 S |
| 4,387,964 | 6/1983 | Arrazola et al. | 350/331 R |
| 4,469,408 | 9/1984 | Kruger | 350/340 |
| 4,482,209 | 11/1984 | Grewal et al. | 350/642 |
| 4,563,059 | 1/1986 | Clark et al. | 350/350 S |
| 4,715,686 | 12/1987 | Iwashita et al. | 350/339 R |

FOREIGN PATENT DOCUMENTS

| | | | |
|---|---|---|---|
| 0228703 | 7/1987 | European Pat. Off. | 252/299.01 |
| 0065926 | 5/1980 | Japan | 350/337 |
| 0170818 | 9/1984 | Japan | 350/330 |
| 0137133 | 6/1986 | Japan | 350/330 |
| 0160702 | 7/1986 | Japan | 350/330 |

OTHER PUBLICATIONS

Finkelman, *Polymer Liquid Crystals* edited by Ciferri et al., Academic Press, 1982, pp. 35–62.

*Primary Examiner*—Stanley D. Miller
*Assistant Examiner*—Nap Thantu
*Attorney, Agent, or Firm*—Peter C. Van Der Sluys

[57] ABSTRACT

An arrangement to produce pictures using light polarized in different directions consists of a picture tube to whose faceplate a polarizer film and a polymer liquid crystal film provided on both sides with transparent conductive layers are joined with a transparent adhesive. By using a polymer liquid crystal film, the arrangement can also be realized on picture tubes having curved faceplates. The polarizer film and the polymer liquid crystal film are joined together preferably by laminating, and the laminate is joined to the faceplate with an adhesive. The polymer liquid crystal film preferably contains a ferroelectric liquid crystal material.

9 Claims, 1 Drawing Sheet

PICTURE-REPRODUCING ARRANGEMENT USING A PICTURE TUBE, AND METHOD OF MANUFACTURING SAME

BACKGROUND OF THE INVENTION

1. Field of the Invention

The invention relates to an arrangement for reproducing pictures by means of a picture tube using light polarized in different directions, wherein a polarizer and a liquid crystal cell provided with transparent electrode areas on both sides are located in front of a faceplate of the picture tube.

2. Description of the Prior Art

An arrangement as mentioned above is disclosed in European Patent Application No. 84 111 766.6, which was published on Apr. 10, 1985, under No. 0 136 696.

With an arrangement of the above kind, two different images can be displayed with one picture tube. The light of the two images being polarized orthogonally in relation to each other. The two images are alternately displayed on the picture tube, preferably in rapid succession. A switching device is provided for switching the liquid crystal cell at the image repetition rate, so that the one image is reproduced using light polarized in one direction, and the other image using light polarized orthogonally thereto.

Using the above arrangement viewed with polarization spectacles, two different viewers can simultaneously view different images on the same screen or one viewer can view a three dimensional image. If the polarization lenses of two pairs of spectacles are each rotated by 90° in relation to each other in their plane of polarization, two viewers can see different images. If the two lenses of a pair of spectacles are displaced by 90° in their planes of polarization, one eye of the viewer views the one image, and the other eye views the other image. Thus, the viewer has the impression of seeing a composite image. This effect can be used to create the impression of a three-dimensional image.

The images displayed on the screen can be produced by two different cameras, or can be computer-generated. The known arrangement for displaying the images has the disadvantage that it takes up a large amount of space in that the optical means are arranged one behind the other, i.e., the faceplate of the picture tube, the polarizer, and the liquid crystal cell, must be held in a precise optical arrangement in relation to each other. Furthermore, the angle at which the image can be viewed is very restricted. Particular difficulties arise if larger picture tubes are used with conventionally curved faceplates.

SUMMARY OF THE INVENTION

It is an object of the present invention to simplify the known arrangement and its production.

It is a further object to enlarge the viewing angle and permit the same viewing angle even with curved screens.

It is a further object of the invention to provide a liquid crystal with faster switching speed.

The present invention contemplates an arrangement for reproducing pictures by means of a picture tube using light polarized in different directions, wherein a polarizer and a liquid crystal cell provided with transparent electrode areas on both sides are located in front of the faceplate of the picture tube. The liquid crystal cell and the polarizer are located directly on the faceplace of the picture tube and are joined together and to the faceplace with a transparent adhesive.

Advantageously the liquid crystal comprises a polymer liquid crystal film which can be formed to the curved surface of the picture tube.

In order to increase switching speed, the polymer liquid crystal film contains a ferroelectric liquid crystal material which is bonded to a polymer material.

A method for producing the above arrangement contemplates that the polymer liquid crystal film is provided with a transparent conductive layer on both sides, and the polarizer film is then laminated to one side of the polymer liquid crystal film, after which the laminate is joined to the faceplate of the picture tube with a transparent adhesive. Alternatively, the polarizer film is provided with a transparent conductive layer on one side and the polymer liquid crystal film is also provided with a transparent conductive layer on one side. The polarizer film is then joined to the polymer liquid crystal film by laminating, so that the coated side of the polarizer film lies on the uncoated side of the polymer liquid crystal film, and that the laminate thus obtained is joined to the faceplate of the picture tube with a transparent adhesive.

By disposing a liquid crystal cell and a polarizer directly on the faceplate of the picture tube, a compact arrangement is obtained. The arrangement is easy to handle and the viewing angle is considerably enlarged. The individual optical parts are held in a reliable manner and in the correct position in relation to each other.

Since the liquid crystal cell and the polarizer are joined together and to the faceplate of the picture tube with a transparent adhesive, the production is simplified considerably.

The adhesive layer required to join the individual parts is relatively thin; nevertheless, an adhesive is selected whose refractive index lies between the refractive indices of the two adjacent layers. Epoxy resin, commercially available from several sources including Ciba-Geigy and Duponu, may be used as a transparent adhesive.

A polymer liquid crystal film is used as a liquid crystal cell and provides unique advantages. Such polymer liquid crystal films were discussed in various papers at the Liquid Crystal Convention in Freiburg in 1984. Also, such polymer liquid crystal films are disclosed in DE-OS 28 31 989 and in German Patent No. 34 30 483.

In contrast to the conventionally used liquid crystal cells, in which a liquid arrangement of liquid crystals is provided between two parallel glass plates, the polymer liquid crystal films constitute a film material in which the liquid crystal material is bonded directly to the polymer material. Thus, the polymer film has liquid crystal properties and, in contrast to conventional liquid crystal cells, is flexible and can therefore readily be joined to the curved faceplate of a picture tube with an adhesive.

In order to increase the switching speed of such a polymer liquid crystal film, ferroelectric liquid crystal material is used.

DESCRIPTION OF THE PREFERRED EMBODIMENT

Figure 1:
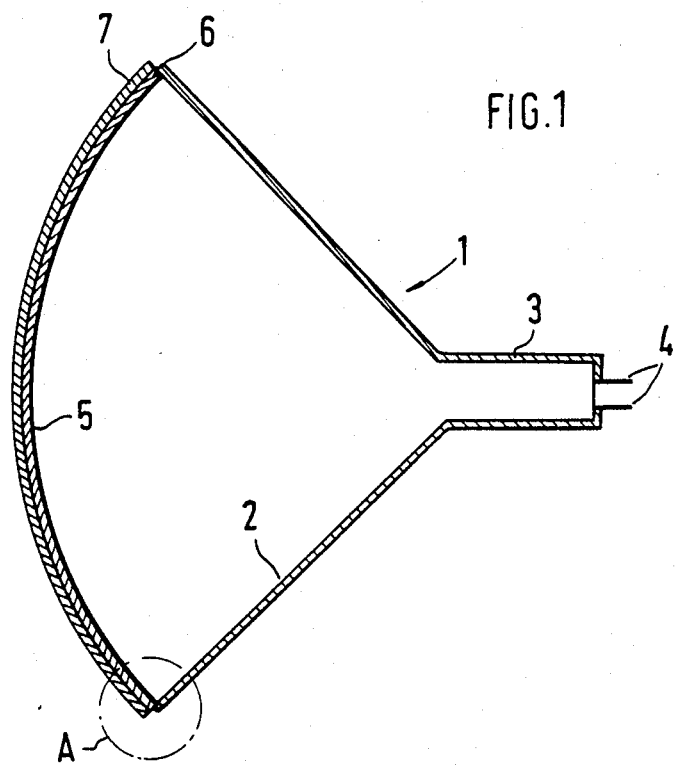
FIG. 1 is a schematic section of a picture tube having a film arrangement, in accordance with the invention, on the faceplate.

A picture tube 1 comprises an envelope 2 which, on one side, passes into a neck 3 on which a base 4 is located. On another side, the envelope 2 passes into a faceplate 5. A polymer liquid crystal film 6 and a polarizer film 7 are disposed on the faceplate 5. The two films 6 and 7 can be joined together and to the faceplate 5 of the picture tube 1 with a transparent adhesive. Alternatively, a laminate of the films 6 and 7 can first be formed, such laminate being joined as a whole to the faceplate 5 of the picture tube 1 with a transparent adhesive.

Figure 2:
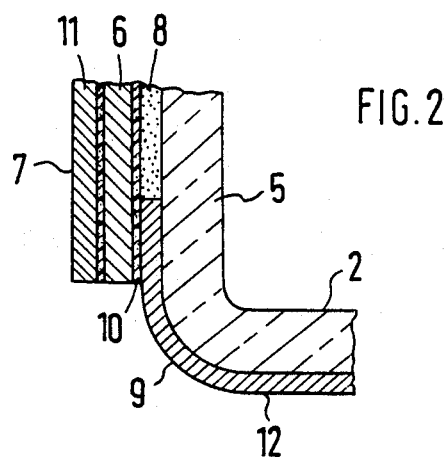
FIG. 2 is an enlargement of part A of FIG. 1 to illustrate the multilayer arrangement.

As shown in FIG. 2, transparent conductive layers 10 and 11 are located on both sides of the polymer liquid crystal film 6, and the polarizer film 7 is disposed on the conductive layer 11. The arrangement of the layers 6, 7, 10 and 11, which preferably form a laminate, is joined to the faceplate 5 of the picture tube with a transparent adhesive layer 8. The adhesive 8 preferably has a refractive index lying between the refractive indices of the adjacent layers. Outside the image region, part of the adhesive is a conductive adhesive 9 which is connected to a corresponding drive circuit via a lead 12. Silver epoxy, also commercially available from Ciba-Geigy and Dupont, may be used as a conductive adhesive.

The polymer liquid crystal film 6 preferably includes a ferroelectric liquid crystal material in order to increase the switching speed. This liquid crystal material may be grafted on a suitable polymer material.

In Table I examples of such graftable ferroelectric liquid crystal compounds are given, where X is a group which is suitable for coupling to polymer chains, e.g., organopolysiloxanes, such as OH, $NH_2$, COOH.

TABLE I

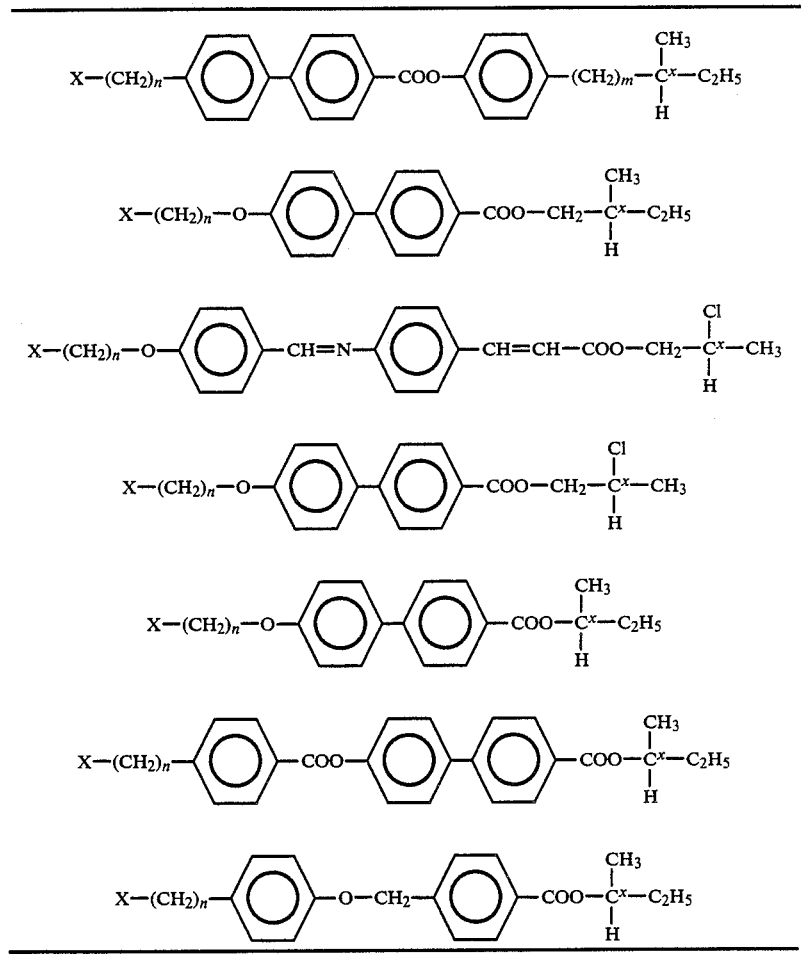

In the examples of graftable ferroelectric liquid crystal compounds, the carbon atoms which cause the chiral properties of the liquid crystals are marked with an x.

Polymer liquid crystal films in which the switching speed has been considerably increased by using ferroelectric liquid crystal compounds offer considerable advantages for other applications, as for example in liquid crystal displays which are suitable for reproducing moving pictures. The unique concept of constructing a liquid crystal film with ferroelectric liquid crystal material is very powerful having significance which goes far beyond use with picture tubes.

Such polymer liquid crystal films with ferroelectric liquid crystal material can be obtained not only by grafting suitable liquid crystal compounds on suitable polymer chains, but also by polymerizing suitable monomers. In Table II, some examples of polymerizable monomers on the basis of acrylic-acid and methacrylicacid esters are given.

TABLE II

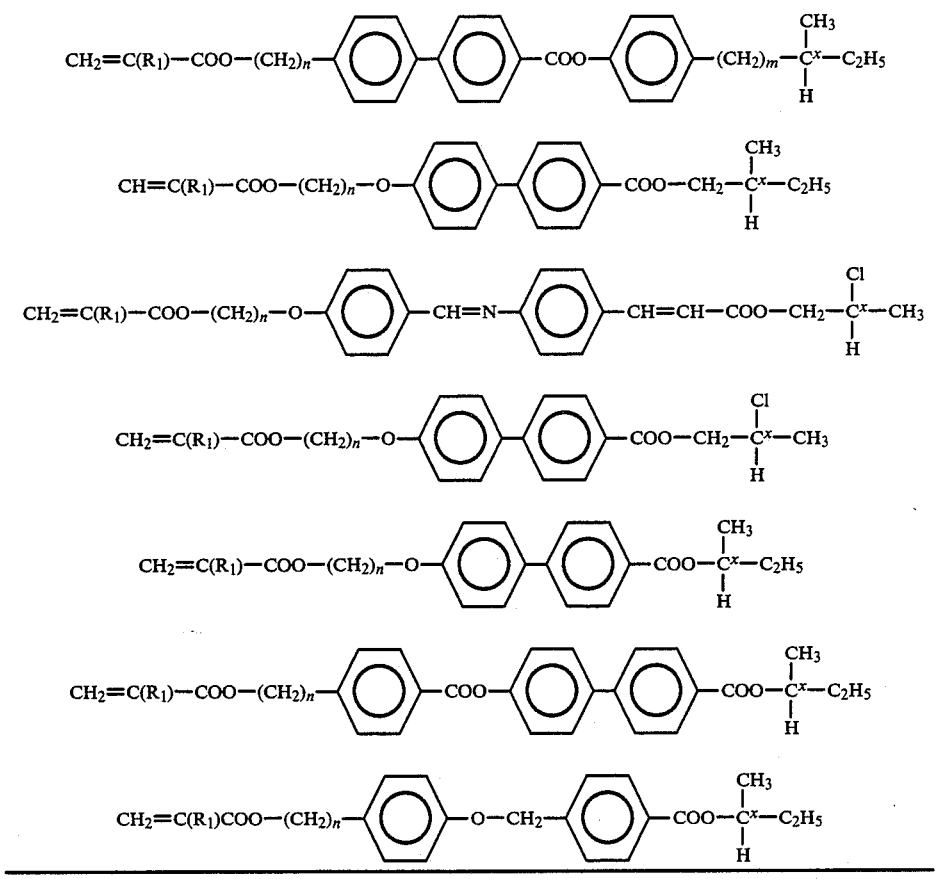

In the known liquid crystal cells having a liquid crystal between two glass plates, the transparent electrodes to switch the liquid crystal cell are located on the inside of the glass plates. In contrast, in the case of polymer liquid crystal films, the transparent electrode layers are located on the outside of the film, so that contact can readily be made to them. In the present arrangement, it is particularly simple to use, at least partly, an adhesive layer of a conductive adhesive which at the same time serves to make contact to the transparent electrode layers. The conductive adhesive which, as a rule, is not transparent, can be applied to hidden areas outside the image region of the screen.

A particularly simple method for producing an arrangement in accordance with the invention is to join together the polarizer film and the polymer liquid crystal film first by laminating, i.e., by applying pressure and/or heat, so that the laminate can be joined with an adhesive to the faceplate of the picture tube as a single part.

To this end, the polymer liquid crystal film can for example be provided on both sides with a transparent conductive layer. The polarizer film is then laminated to one side of the polymer liquid crystal film, and the laminate is then joined to the faceplace of the picture tube with a transparent adhesive.

Another possibility is to provide the polarizer film on one side with a transparent conductive layer and to provide the polymer liquid crystal film on one side with a transparent conductive layer as well. The two films are then laminated together so that the coated side of the polarizer film lies on the uncoated side of the polymer liquid crystal film. In this manner, conductive layers are located on both sides of the polymer liquid crystal film without the need to coat both sides, as is required in the methods described above.

What is claimed is:

1. An arrangement for reproducing pictures, comprising:
   a picture tube having a facepalte;
   a polarizer; and
   a liquid crystal cell provided with transparent electrode areas on both sides, said liquid crystal cell and said polarizer having surfaces in juxtaposition, said juxtaposed polarizer and liquid cell being located directly on a front surface of the faceplate of the picture tube.

2. An arrangement as claimed in claim 1, wherein the liquid crystal cell and the polarizer are joined together at their juxtaposed surfaces and the thus joined polarizer and liquid crystal cell are further joined to the faceplate of the picture tube with a transparent adhesive.

3. An arrangement as claimed in claim 2, wherein he adhesive has refractive index which lies between the refractive indices of the faceplate and the material joined to said faceplate.

4. An arrangement as claimed in claim 1, wherein the liquid crystal cell is constituted by a polymer liquid crystal film.

5. An arrangement as claimed in claim 4, wherein the polymer liquid crystal film contains a ferroelectric liquid crystal material which is bonded to a polymer material.

6. An arrangement as claimed in claim 2, additionally comprising a layer of conductive adhesive disposed between at least a portion of the joined polarizer and liquid crystal cell and the faceplate, said conductive adhesive being in contact with at least one of said transparent electrode areas of said liquid crystal cell.

7. An arrangement for reproducing pictures, comprising:
   a picture tube having a faceplate;
   a polarizer;
   a liquid crystal cell provided with transparent electrode areas on both sides, said liquid crystal cell and said polarizer having juxtaposed surfaces joined together, said joined polarizer and liquid crystal cell being disposed directly on the faceplate of the picture tube; and
   a layer of adhesive joining said faceplate to said joined polarizer and liquid crystal cell, said adhesive layer being constituted by transparent portion and a conductive portion.

8. An arrangement as claimed in claim 7, wherein the liquid crystal cell is constituted by a polymer liquid crystal film.

9. An arrangement as claimed in claim 8, wherein the polymer liquid crystal film contains a ferroelecric liquid crystal material which is bonded to a polymer material.

* * * * *